Feb. 7, 1967  A. E. BAGGS, JR  3,303,077
METHOD AND APPARATUS FOR MANUFACTURING PHOTOGRAPHIC PRODUCTS
Filed Dec. 4, 1961  7 Sheets-Sheet 1

INVENTOR.
Arthur E. Baggs, Jr.
BY
Brown and Mikulka
ATTORNEYS

Feb. 7, 1967  A. E. BAGGS, JR  3,303,077
METHOD AND APPARATUS FOR MANUFACTURING PHOTOGRAPHIC PRODUCTS
Filed Dec. 4, 1961  7 Sheets-Sheet 2

INVENTOR.
Arthur E. Baggs, Jr.
BY
Brown and Mikulka
ATTORNEYS

INVENTOR.
Arthur E. Baggs Jr.
BY
Brown and Mikulka
ATTORNEYS

Feb. 7, 1967          A. E. BAGGS, JR          3,303,077

METHOD AND APPARATUS FOR MANUFACTURING PHOTOGRAPHIC PRODUCTS

Filed Dec. 4, 1961          7 Sheets-Sheet 4

INVENTOR.
Arthur E. Baggs, Jr.
BY
Brown and Mikulka
ATTORNEYS

Feb. 7, 1967 A. E. BAGGS, JR 3,303,077
METHOD AND APPARATUS FOR MANUFACTURING PHOTOGRAPHIC PRODUCTS
Filed Dec. 4, 1961 7 Sheets-Sheet 5

INVENTOR.
Arthur E. Baggs, Jr.
BY
Brown and Mikulka
ATTORNEYS

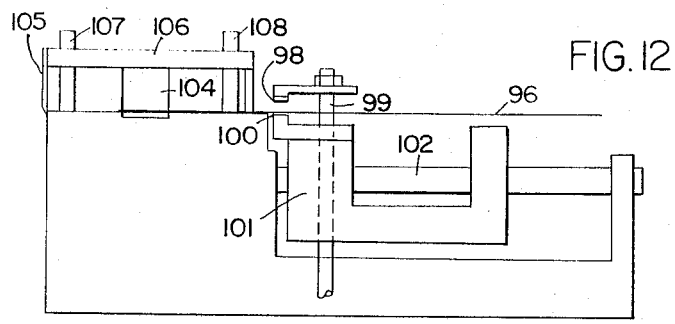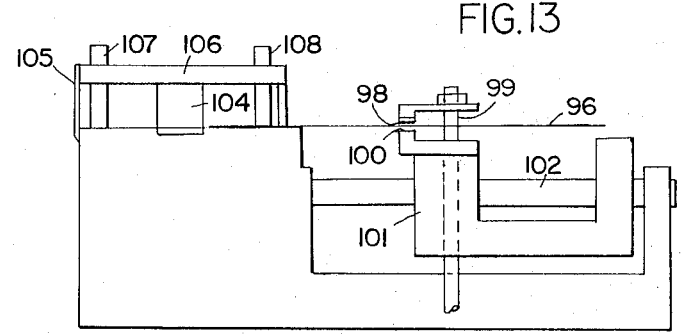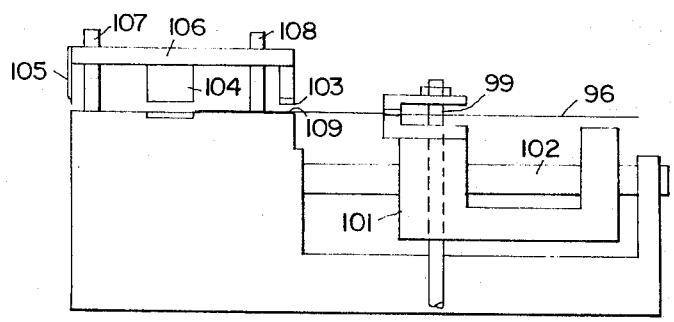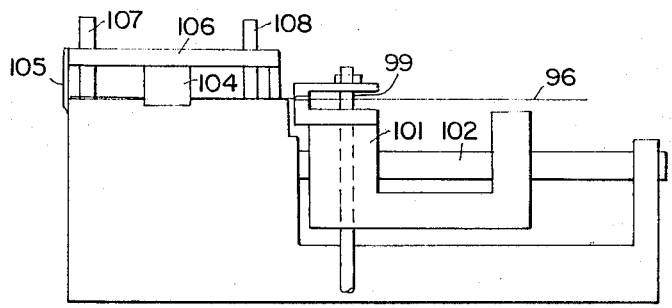

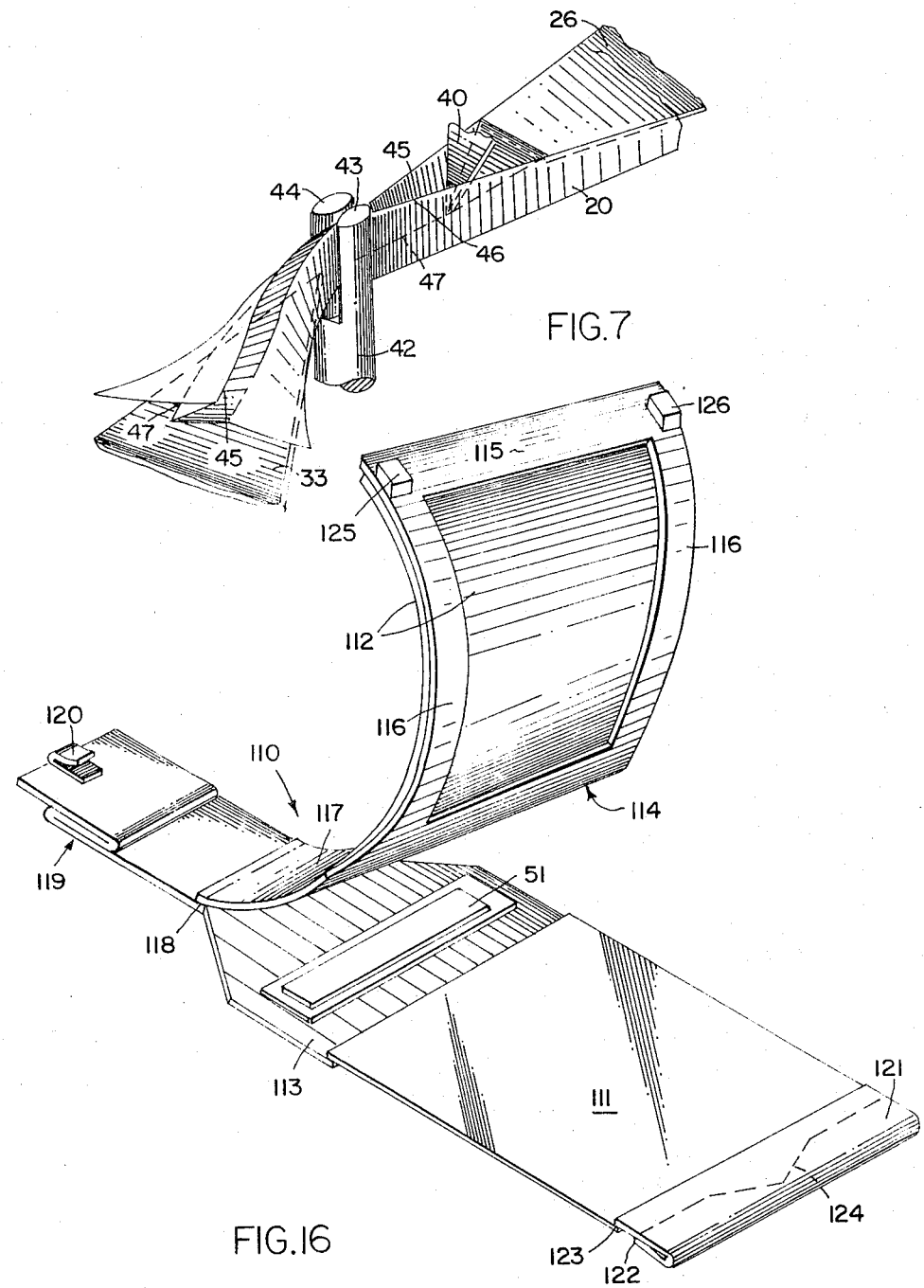

United States Patent Office 3,303,077
Patented Feb. 7, 1967

3,303,077
METHOD AND APPARATUS FOR MANUFACTURING PHOTOGRAPHIC PRODUCTS
Arthur E. Baggs, Jr., South Lincoln, Mass., assignor to Polaroid Corporation, Cambridge, Mass., a corporation of Delaware
Filed Dec. 4, 1961, Ser. No. 156,575
16 Claims. (Cl. 156—108)

This invention relates to methods and apparatus for manufacturing photographic products and, more particularly, to novel methods and apparatus for manufacturing photographic products comprising film units adapted to be photoexposed and thereafter processed by superposing a photosensitive sheet and a second sheet with a layer of fluid processing composition spread therebetween.

A variety of forms of photographic products have been proposed wherein a photosensitive sheet is adapted to be exposed in conjunction with a camera or other appropriate exposure means, and subsequently processed by a fluid-processing composition which is distributed between the photosensitive sheet and a second sheet superposed therewith. One specific embodiment of such products is a film unit comprising a photosensitive sheet, a second sheet, leader means connecting the two and a container of fluid-processing composition, the two sheets adapted to be moved into superposition between a pair of pressure-applying members for distributing the fluid-processing composition between the sheets. A plurality of such film units may be associated in a container, or magazine, adapted to be employed with appropriate exposure means, such as a camera or film pack holder, including means for holding a photosensitive sheet for exposure, means, such as a pair of pressure-applying members, for distributing a processing fluid between the two sheets of the film unit, and means for effecting the movement of the sheets between the pressure-applying members. The various elements comprising the film unit are associated in a particular manner to facilitate exposure of the photosensitive element, superposition thereof with the second sheet, and the spreading of the fluid-processing composition therebetween.

An object of the present invention is to provide a novel method of manufacturing photographic products of the type described which is fast, economical, continuous and easily controlled.

Other objects of the invention are: to provide a method of manufacturing photographic products of the type described which facilitates the use of automatic means for performing the sequence of operations of the method and for automatically controlling the operations; to provide a method of manufacturing photographic products comprising film units of the type described wherein a plurality of said film units are formed in a continuous web and a portion of the web comprising a single, finished film unit is severed from the remainder of the web; to provide a method of manufacturing photographic products comprising a plurality of flexible sheet materials wherein continuous webs of each of said sheet materials are associated in a lighttight enclosure to form a continuous web of said photographic products, and a portion of the web is severed from the remainder thereof, said portion comprising a finished, individual photographic product; to provide a method of bringing into association within a lighttight enclosure a plurality of continuous webs of flexible sheet materials and performing a sequence of operations thereon resulting in the fabrication of a photographic product; and, to provide novel apparatus for the continuous manufacture of photographic products of the type herein described.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 7 is a perspective view of a portion of the apparatus of FIG. 6, showing the material being folded;

FIGS. 12 through 15 are a series of side views of a preferred embodiment of a web feeding and cutting section of the apparatus of FIG. 2; and FIG. 16 is a perspective view of one form of photographic product made according to the process of the present invention.

Figure 1:
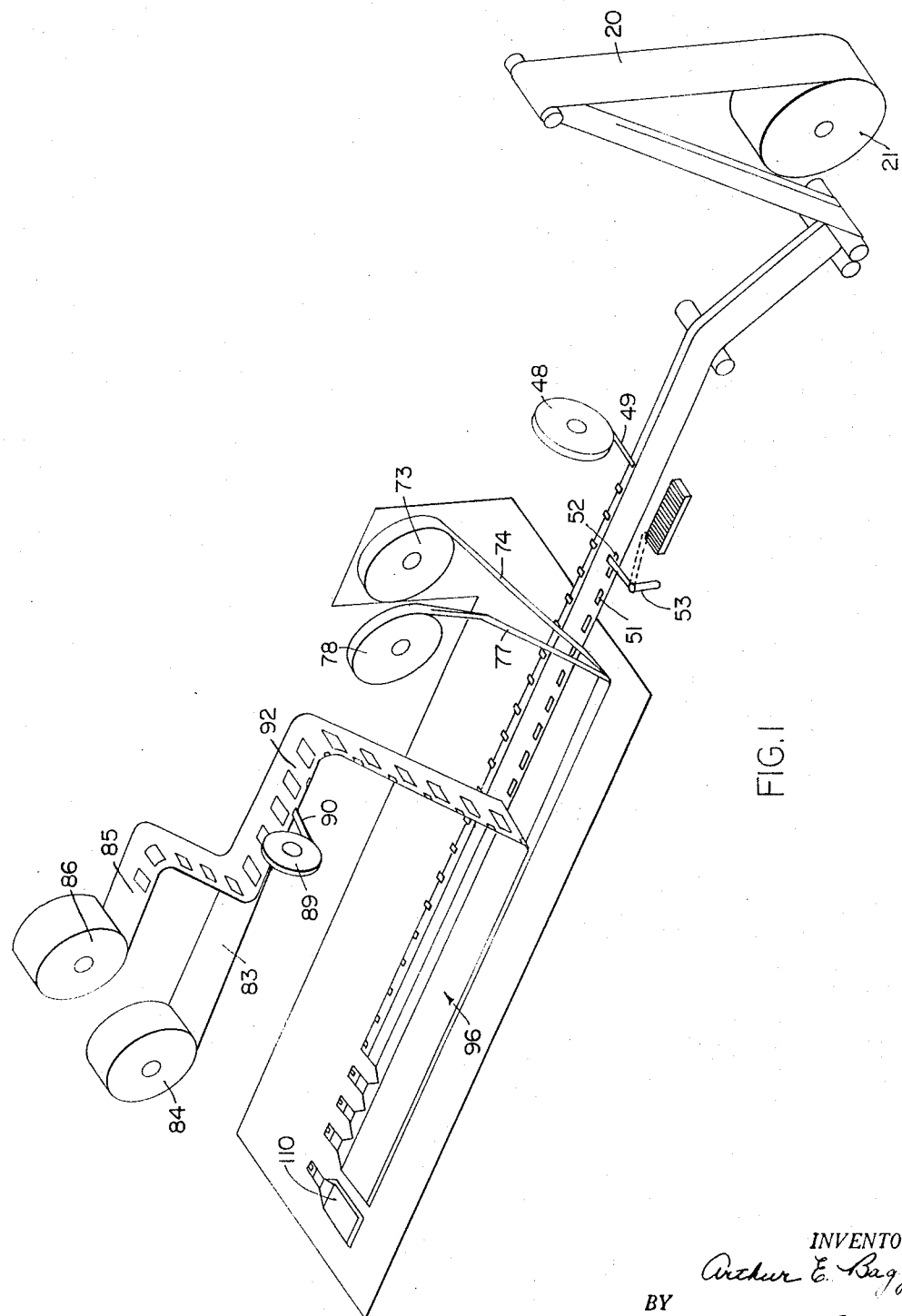
FIGURE 1 is a perspective view, somewhat diagrammatic, of the various materials used in the manufacture of the photographic product and their manner of association.

Generally, the present invention concerns methods of manufacturing photographic products in the form of film units, each comprising a photosensitive sheet, a second sheet adapted to be superposed with the photosensitive sheet following exposure thereof, a container of a fluid processing composition adapted to be distributed between the superposed photosensitive and second sheets to effect the processing thereof, and leader means for moving the photosensitive and second sheets into superposition and in engagement with means for distributing the processing fluid. Photographic products of this type include, for example, those described in U.S. Patents Nos. 2,495,111, issued January 17, 1950, to Edwin H. Land; 2,554,889, issued May 29, 1951, to Otto E. Wolff; 3,002,437, issued October 3, 1961, to Vaito K. Eloranta; and 2,978,971, issued April 11, 1961, to William H. Eburn, all of which are assigned to applicant's assignee.

Various forms of apparatus for exposing and processing film units of the foregoing types have also been proposed, and may be found, for example, in U.S. Patent 2,435,720, issued February 10, 1948, to Edwin H. Land, and copending application Serial No. 749,024, of Vaito K. Eloranta, filed July 16, 1958, now Patent No. 2,991,702, issued July 11, 1961, also assigned to the same assignee.

A photosensitive sheet, a second sheet, means for carrying a fluid-processing composition and means for advancing the photosensitive and second sheets into superposition are common elements of each of the film units of the above inventions. In addition, a number of embodiments include other elements which are designed to perform special functions, such as preventing excess processing fluid from escaping from within the film unit, facilitating the sequential withdrawal of film units from the apparatus wherein they are contained, etc. The present invention is directed to a process or method of manufacturing film units comprising only the basic elements named above, as well as the more complex type with a number of additional elements. The invention will be described in detail for a specific embodiment relating to manufacture of film units similar to those described in the above cited U.S. Patent 2,978,971. The apparatus is shown diagrammatically where possible and certain elements thereof may be altered or omitted to accommodate various embodiments of the film unit without departing from the scope of the invention.

Since all of the essential elements of the film units, with the exception of means for carrying a fluid-processing composition, are flexible sheet materials, it is convenient to supply such materials in the form of continuous webs as from a supply roll or coil of the flexible material. A plurality of operations is performed on the various webs and, depending upon the particular form of apparatus used to carry out the invention, may be performed more easily while the webs are stationary rather than moving. In the embodiment shown, some operations, such as cutting, applying heat and/or pressure for joining certain of the materials, etc., are performed by reciprocating elements of the apparatus which remain stationary with respect to the direction of travel of the materials. Therefore, means are provided to allow the materials to be alternately moving and stationary.

Referring now to the drawings, wherein like numerals denote like elements and materials throughout the several views, in FIGURE 1 is seen a diagrammatic representation of the various materials showing the manner in which they are brought together and the operations performed thereon to produce a finished film unit. The portion of the figure enclosed by the solid line indicates generally that part of the process which is carried out within a lighttight enclosure. A continuous web 20 of a flexible sheet material, such as paper, plastic or the like, is fed from a supply roll 21 through folding means 22 (FIG. 2), in which web 20 is continuously folded parallel to its direction of travel in the nature of a Z.

Figure 5:
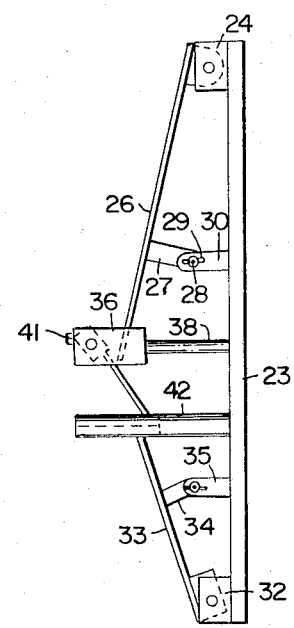
Figure 6:
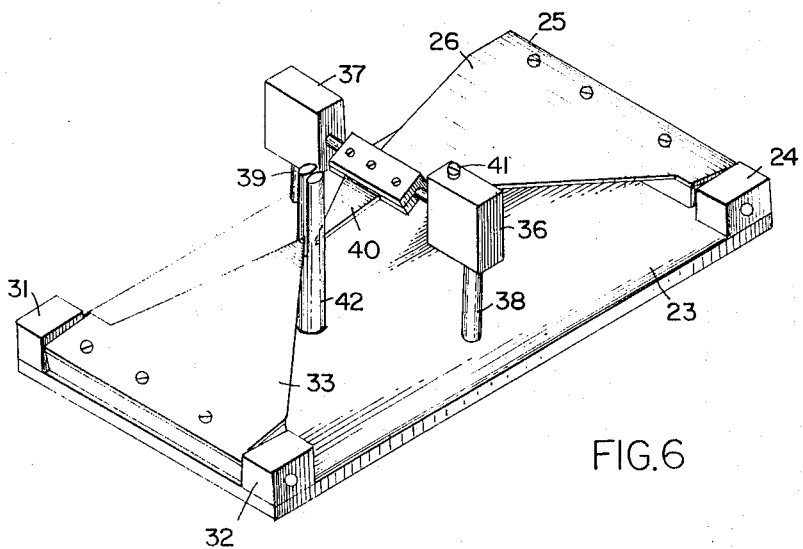
Figure 8:
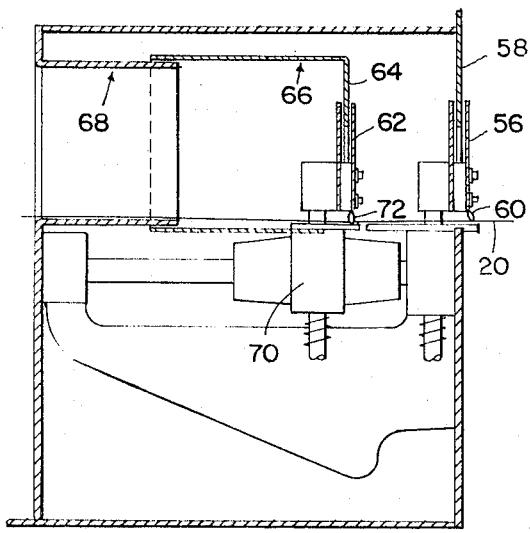
FIGS. 8 through 11 are a series of side views, partly in section, of a preferred embodiment of an inlet portion of the enclosure of FIG. 3.
Figure 9:
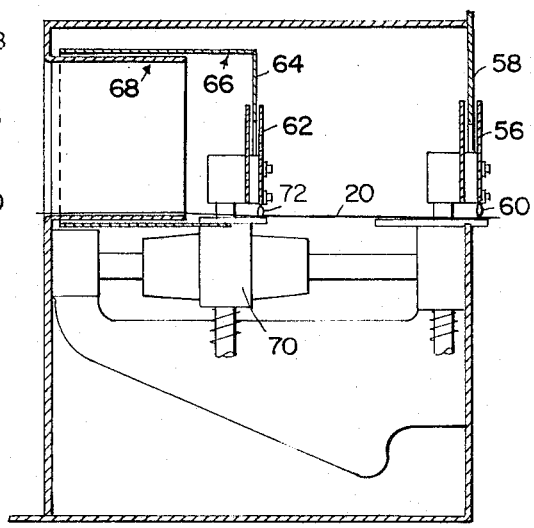
Figure 10:
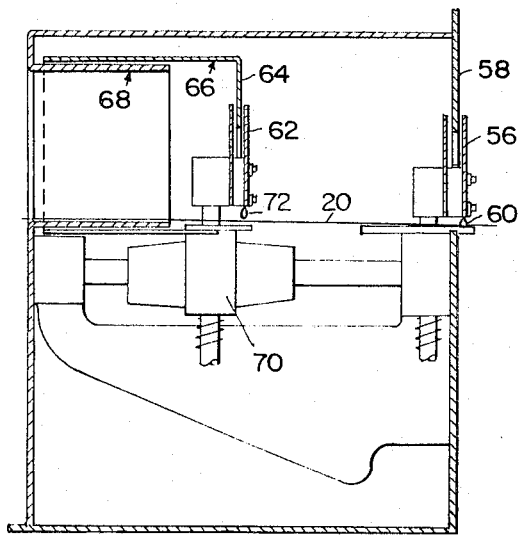
Figure 11:
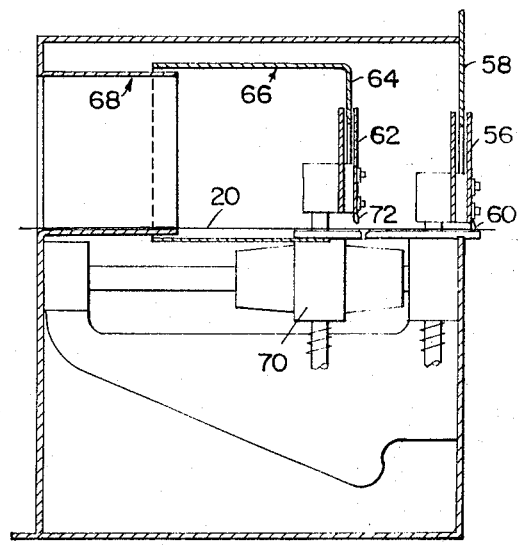

The operation and essential details of folding means 22 may be seen in FIGS. 4 through 7. Plate 23 mounted on an appropriate frame, supports brackets 24 and 25 which provide a pivotal mounting for plow plate 26. Arm 27 is fixedly attached to plow plate 26 and provide means for adjusting the angular position thereof by bolt 28 which passes through slot 29 in arm 30 which is fixed to plate 23 (FIG. 5). Brackets 31 and 32 provide a similar pivotal mounting for plow plate 33 at the opposite end of plate 23 from the mounting of plow plate 26. Arms 34 and 35 provide an adjustable rigid mounting. Brackets 36 and 37, supported by bars 38 and 39 at a distance from plate 23, provide a pivotal mounting for plow plate 40. The angular position of plow plate 40 on its pivotal mounting may be made rigid by tightening set screw 41. Bar 42 is fixedly attached to plate 23 and projects outwardly therefrom between the ends of plow plates 33 and 40. Bar 42 is divided parallel to its long axis from its outer extremity toward plate 23 into two sections 43 and 44. As best seen in FIG. 7, web 20 is drawn over plow plate 26, under plow plate 40 and through the divided portion of bar 42. This has the effect of folding web 20 in the nature of an M, creases 45 and 46 being caused by the two edges of plow plate 26, and the center crease 47 by the point of plow plate 40. As web 20 emerges from between sections 43 and 44 of bar 42 it is drawn over plow plate 33, the point of which passes between the sections of web 20 on either side of crease 46. This has the effect of removing crease 46, leaving only creases 45 and 47 and web 20 is now folded in the nature of a Z.

A supply roll 48 of flexible material 49, preferably a thin metal sheet or foil, is fed toward web 20, substantially perpendicular to the direction of travel thereof, and a portion of material 49 is attached to web 20 at or near one edge thereof. Material 49 may be attached to web 20 by pressure and/or heat for example, for an adhesive surface of either material or a heat-sensitive coating, such as plasticized nitrate, plasticized ethyl cellulose or polyethylene, on either material. Feeding, attaching and severing means, indicated generally at 50 (FIG. 2), may be of any appropriate design, previously known in the art, such as a reciprocating gripper feed, laminating head and shear die. As material 49 is fed into position on web 20, heat and/or pressure is applied, causing the two materials 20 and 49 to adhere at their contiguous surfaces, and a portion of material 49 is severed from the remainder thereof to become a separate element attached to continuous web 20. After being severed, a portion of material 49 projects beyond the edge of web 20 at which it is attached and is subsequently bent back upon itself, as explained later.

Rupturable container 51, containing a fluid processing composition, is attached to web 20 either by a separate adhesive strip (not shown) or, in a preferred embodiment, by means similar to those employed in attaching material 49 to web 20. The container is formed substantially as shown in U.S. Patent No. 2,543,181 and comprises a rectangular blank of fluid- and air-impervious sheet material folded longitudinally upon itself to provide two walls bonded together at their margins to form an elongated cavity for the processing fluid. The longitudinal seal is weaker than the end seals and is adapted to become unsealed in response to hydraulic pressure generated within the fluid contents of the container by the application of compressive pressure thereto. Container 51 may be placed in position on web 20 either by hand or by appropriate mechanical means, such as air chuck 52 mounted on swinging arm 53. Air chuck 52 engages a container by vacuum, is lifted vertically by arm 53 which then swings to the position indicated by solid lines above web 20 (FIG. 1). Arm 53 is then lowered, air chuck 52 positioning and holding container 52 while it is attached to web 20 by lamination 57, for example, constructed and arranged to apply heat and pressure to a marginal portion of container 51 and causes it to adhere to web 20 by virtue of a heat-sensitive coating previously applied to either material. When the seal has been effected the vacuum is released and arm 53 returns for chuck 52 to engage another container.

Figure 2:
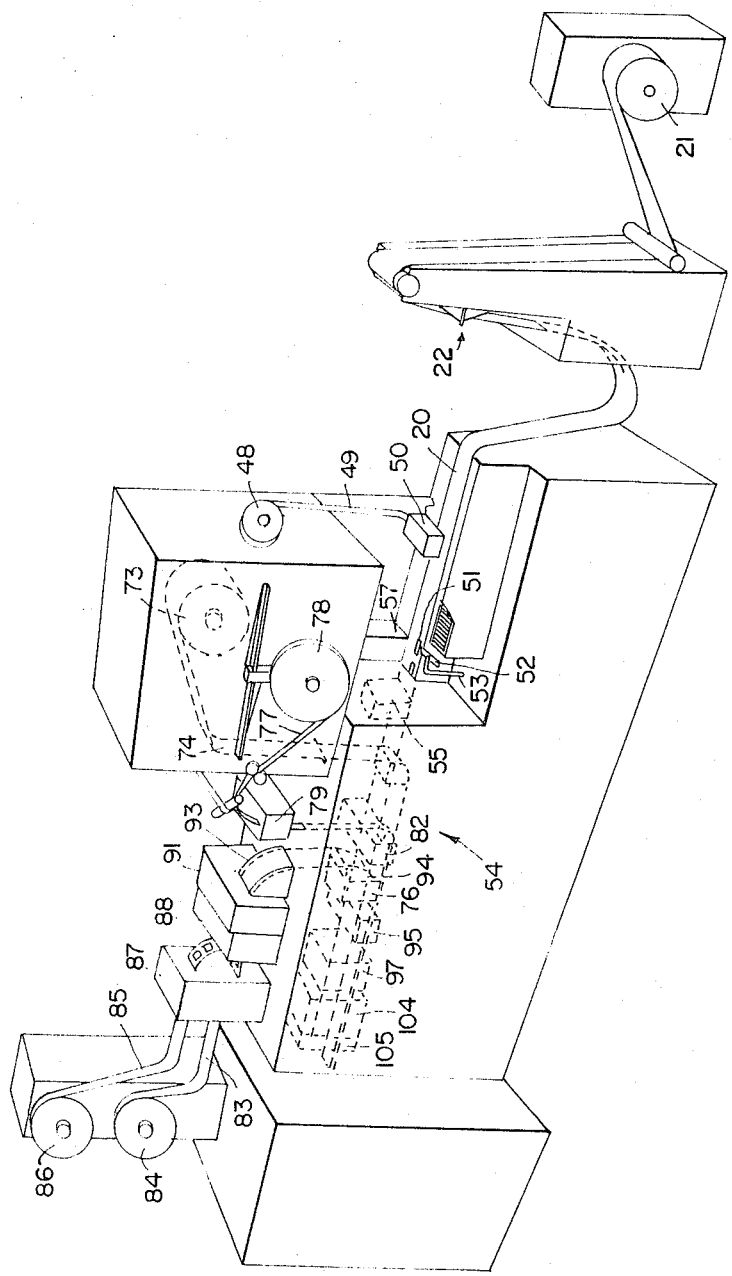
FIG. 2 is a perspective view, also somewhat diagrammatic, of a preferred embodiment of the apparatus of the present invention.
Figure 3:
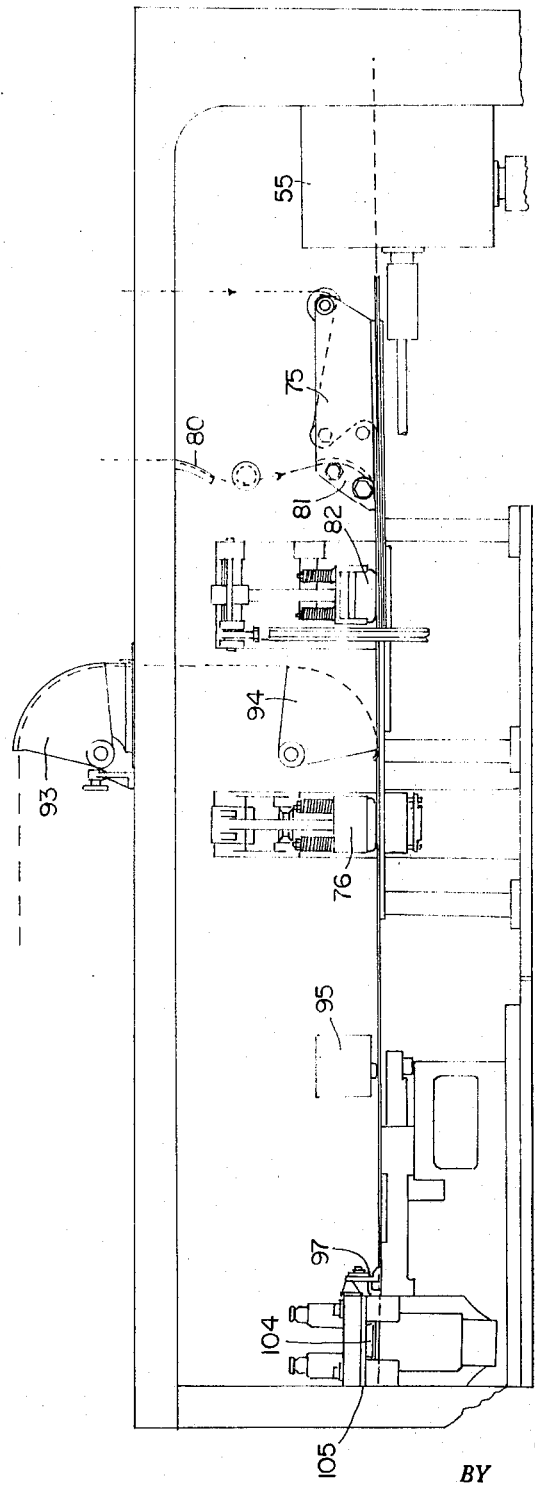
FIG. 3 is a side elevational view of the interior of the enclosed portion of the apparatus of FIG. 2.
Figure 4:
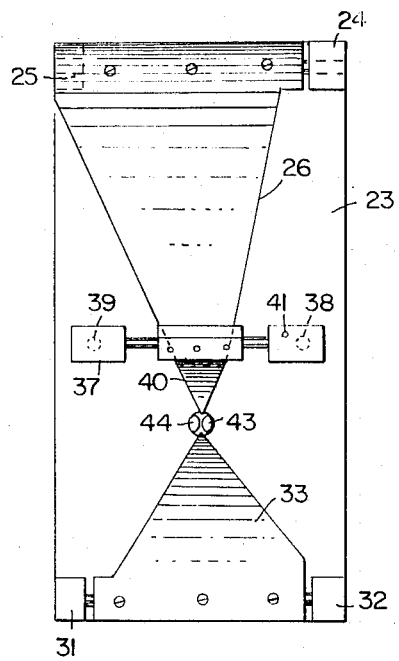
FIGS. 4, 5 and 6 are front, side and perspective views, respectively, of a preferred embodiment of a portion of the apparatus of FIG. 2 for performing a folding operation.

Web 20 then enters a lighttight enclosure, indicated generally by 54 (FIG. 2), through light trap indicated digarammatically at 55, in FIGS. 2 and 3, a preferred embodiment of the structure of which is shown in FIGS. 8 through 11. As previously mentioned, web 20 is alternately moving and stationary. Panel 56 is arranged in a wall 58 of enclosure 54 and moves vertically between the open position, shown in FIGS. 8 and 9, when web 20 is moving, and the closed position, shown in FIGS. 10 and 11, when web 20 is stationary. When panel 56 is in the closed position, bumper 60, made of a resilient material such as rubber, is in contact with web 20 and prevents light from entering enclosure 54. Panel 62 is arranged in a wall 64 of box 66 which is enclosed on five sides, being open on the side opposite wall 64. Box 68, enclosed on four sides and open at both ends, extends inside the open end of box 66. Panel 62 moves vertically between the open position, shown in FIGS. 10 and 11, when web 20 is stationary, and the closed position, shown in FIGS. 8 and 9, when web 20 is moving. Box 66 is mounted on carriage 70 which moves horizontally with web 20 and returns to its original position when web 20 is stationary. Bumper 72 on the lower edge of panel 62 is in contact with web 20 and prevents the passage of light when panel 62 is in the closed position. The complete cycle of operation for light trap 55 is as follows: web 20 is stationary, panel 62 moves to the closed position, panel 56 moves to the open position (FIG. 8); web 20 moves horizontally, carriage 70 moves with the same speed and direction, panel 62 remaining closed, and panel 56 remaining open (FIG. 9); web 20 stops, carriage 70 also stops, panel 56 moves to the closed position, panel 62 moves to the open position (FIG. 10); web 20 remains stationary, carriage 70 returns to its original position (FIG. 11); the cycle then begins again, as above. It is apparent that since at least one of the panels is closed at all times, no light will enter through light trap 55 as web 20 enters lighttight enclosure 54.

A supply roll 73 of a photosensitive material carried on a suitable support is mounted within lighttight enclosure 54. The photosensitive material may comprise any of the materials used in photography, including, for example, the silver halides or other photosensitive heavy metal salts having a developable latent image formed therein by exposure, the ferric salts and the diazonium compounds. The support for the photosensitive layer may comprise any of the flexible sheet materials generally used for film base, including paper, plastic and the like. The photosensitive material on its support is supplied as a continuous web 74 from roll 73, passed around guide 75, and continuously attached to web 20 adjacent one edge of each web. In the illustrated embodiment, it is more convenient to attach the back of web 74, that is, the support material, to web 20, preferably by application of heat. However, it is also possible to attach the front, or photosensitive face, of web 20 using the photosensitive emulsion as the heat-sensitive coating.

Continuous web 77 of flexible sheet material, such as paper, is fed from supply roll 78 which may be contained within enclosure 54 or mounted externally thereto, as shown. A V-shaped portion is cut at regular intervals from one edge of web 77 as it passes through apparatus 79. As it emerges from apparatus 79, web 77 is folded longitudinally upon itself, and then enters enclosure 54 through light trap 80 (FIG. 3) comprising a simple change of direction guide. It is possible, of course, to use a double-panel, reciprocating light trap, such as 55, but for a web of flexible sheet material with nothing attached to it, the simpler trap with no moving parts is normally satisfactory. After entering enclosure 54, web 77 passes around guide 81 and is attached to the edge of web 74 opposite that at which web 20 is attached. The attachments between webs 20 and 74, and webs 77 and 74 may be made simultaneously as by double-laminator 82. Also, web 77 is attached to itself at this time, as seen in FIG. 16 at 122. If web 77 is provided with a heat-sensitive coating, such as one of the aforementioned, it may be sealed to itself by the application of heat from a laminator. The emulsion surface of web 74 will provide a satisfactory heat-sensitive surface for attaching webs 74 and 77.

Web 83, comprising a flexible sheet material which is to serve as the second sheet of the film unit, is supplied from roll 84. While the second sheet of the film unit may merely aid in the spreading of the fluid processing composition carried by container 51 on the photosensitive sheet, in a preferred form of the film unit the second sheet is adapted to provide a support for a positive transfer image. The image may be produced, for example, by a silver halide diffusion-transfer reversal process, such as described in U.S. Patents Nos. 2,543,181, issued February 27, 1951 and 2,662,822, issued December 15, 1953, both in the name of Edwin H. Land and assigned to applicant's assignee. Web 83, accordingly, may comprise an image-receiving layer, such as described in the above-mentioned patents, carried on a flexible support sheet.

Web 85, of a flexible material such as paper, is fed from supply roll 86 through a standard die-cutting apparatus, indicated generally at 87, where substantially rectangular areas are cut from an interval portion of web 85. Webs 83 and 85 are then arranged with the rectangular cut-out areas of web 85 overlying web 83 and attached over at least that portion of their contiguous surfaces bounding said cut-out areas. The image-receiving layer of web 83 may be used as a heat-sensitive coating or web 85 may be provided with a coating suitable for this purpose, as previously described, and the two webs attached by laminator 88.

Supply roll 89 of a flexible material 90, preferably paper, cardboard or the like, is fed toward web 85 substantially perpendicular to the direction of travel thereof, and a portion of material 90 is attached to web 85 at or near one edge thereof. Feeding, attaching and severing means 91 may be similar to means 50, comprising means for feeding material 90 into position on web 85, means for applying heat and/or pressure, causing the two materials to adhere by virtue of a pressure- or heat-sensitive coating on either material, and severing means such as a shear die. As material 90 is fed into position by appropriate intermittent feeding means, pressure and/or heat is applied, as by a laminator, and a portion of material 90 is severed from the remainder thereof to become a separate element attached to web 85. It would also be possible, of course, to feed material 90 in the same direction as web 85. This would allow skiving or contouring of the edge of material 90 nearest the cut-out areas of web 85, which may be desirable when employing the photographic product of the process in conjunction with previously proposed photographic apparatus.

Webs 83 and 85 now form a single continuous web 92 which passes through light trap 93 into enclosure 54. Light trap 93 comprises a change of direction guide similar to light trap 80, but external to enclosure 54. Within enclosure 54, web 92 passes around guide 94 and is attached at one edge to a portion of web 20 at a point farther from the edge at which web 74 is attached than are containers 51; that is, containers 51 will be attached to web 20 between the attachments of webs 74 and 85. In a preferred embodiment lamination 76 provides heat and pressure for attaching webs 92 and 20 by virtue of a heat-sensitive coating on either web. All of the initially independent webs 20, 74, 77, 83 and 85, have now been joined to form composite web 96 within lighttight enclosure 54. It will be noted that the photosensitive surface of web 74 faces the image-receiving surface of web 83, and containers 51 lie between webs 20 and 85.

The apparatus indicated at 95 is provided to bend material 49 back on itself to form a crease substantially adjacent to the edge of web 20. After being bent in this manner, material 49 assumes the shape best seen in FIG. 16 and becomes engagement member 120, the purpose of which is explained in above-cited U.S. Patent 2,978,971.

A preferred method of feeding composite web 96 is by a reciprocating gripper feed mechanism 97 (FIG. 2). The essential details and cycle of operations of gripper feed 97 are shown in FIGS. 12 through 15. In order to maintain lateral registration of composite web 96, it is important that it be positively held at all times. For this reason, two sets of gripper jaws are provided. Both sets reciprocate vertically between open and closed positions and one set reciprocates horizontally to engage and feed composite web 96 while the other set remains horizontally stationary. Upper jaw 98 moves vertically on shaft 99 between the open position, shown in FIGS. 12 and 13, and the closed position, shown in FIGS. 14 and 15, at which time composite web 96 is engaged between upper jaw 98 and lower jaw 100. Carriage 101, upon which jaws 98 and 100 are mounted, moves horizontally on shaft 102 between the positions of FIGS. 12 and 13. Jaw 103, die block 104, and knife 105 are mounted on frame 106 which moves vertically on shafts 107 and 108 between the upper position, shown in FIG. 14, and the lower or cutting position, shown in FIGS. 12, 13 and 15. When frame 106 is in the closed position, composite web 96 is engaged between jaw 103 and the surface of table 109. Reciprocal vertical motion may be imparted to shafts 107, 108 and 99 and horizontal motion to shaft 102 by a cam drive arrangement, preferably of the constant acceleration type. The complete cycle of operation is as follows: carriage 101 is in the left position, jaw 98 is open, frame 106 is in the lower position, composite web 96 being engaged between jaw 103 and table 109 (FIG. 12); carriage 101 moves to the right position, jaw 98 remaining open, frame 106 remaining in the lower position (FIG. 13); jaw 98 closes, engaging composite web 96, frame 106 moves to the upper position, jaw 103 releasing composite web 96 (FIG. 14); carriage 101 moves to the left position, carrying with it composite web 96, and, when the travel has stopped, frame 106 moves to the lower position (FIG. 15). When frame 106 moves to the lower position, a scrap portion is cut from composite web 96 by die block 104 and an end portion is severed from the remainder of the web by knife 105. Upper jaw 98 then moves to the open position, as in FIG. 12, and the sequence begins again. The shape of the scrap portion cut out by die block 104 is indicated in FIG. 1. The portion is removed from the edge remote from the photosensitive material and between each of the containers 51. Composite web 96 is severed by knife 105 at a point substantially mid-way in that portion from which the scrap has been removed. Thus, the portion severed from composite web 96 comprises a single, complete, individual photographic product such as film unit 110.

Feeding composite web 96 by gripper mechanism 97 exerts a simultaneous pull on all the individual webs coming into enclosure 54 and eliminates any necessity of synchronizing a plurality of feed systems. Although it is possible to feed each web from its supply roll solely by the pull of gripper mechanism 97 this would result in a large force being exerted on composite web 96 and on the individual webs due to inertia of the rolls and friction between the various webs and the apparatus. It is normally desirable to provide a free loop (not shown) in each web being fed from a supply roll, according to a common practice of web feeding with reciprocating gripper means. The free loop may be provided at any convenient point in the web by placing a separate feed means, such as driven rolls or grippers, between the supply roll and the free loop. Since the size of the free loops is not critical, there is no necessity to synchronize strictly the operating speeds of the separate feed systems which provide the free loops.

The disclosed embodiment of apparatus for performing the process lends itself well to a continuous underdrive for all driven elements of the apparatus, particularly those within lighttight enclosure 54. The reciprocating laminators, light trap 55, cutters and gripper feed may all be operated by cams carried on a single drive shaft. The cam drive mechanism of the web feeding means should be of the constant acceleration type in order that composite web 96 will be subject to substantially uniform tension throughout its travel.

It would also be possible to perform the process by continuously feeding the various webs, as by driven feed rolls, rather than by reciprocating gripper feed. In a continuous feed system the various operations would also be performed in a continuous manner on moving webs, rather than intermittently as the webs are stationary. The attaching operations could be performed, for instance, by pressure rolls, or, if heat-sensitive materials are used, by heated rolls. The die cutting operations, such as that of web 85, could be accomplished by wheels carrying suitable die blocks adapted to engage the web and punch out portions thereof. The individual film units could be severed from composite web 96 by a continuously revolving cutting roll provided with a plurality of radially disposed knives. Reciprocating light trap 55 could be replaced by a change-of-direction type, such as those through which webs 77 and 92 enter, and containers 51 attached after web 20 enters enclosure 54, if necessary.

An enlarged view of film unit 110, comprising the photographic product manufactured according to the illustrated embodiment of the invention, is shown in FIG. 16. Film unit 110 comprises a first or photosensitive sheet 111 and a second or print-receiving sheet 112. First sheet 111 is joined at its leading edge to a leader sheet 113 and second sheet 112 is mounted on carrier sheet 114 comprising a trailing end section 115, an intermediate section 116 and a leading end section 117. Leader sheet 113 and carrier sheet 114 are joined at 118. The wide portion of leader sheet 113 has attached thereto container 51 carrying a fluid processing agent, the narrow portion is folded in the nature of a Z 119, and engagement member 120 is secured to the narrow portion adjacent the leading edge. Attached to the trailing end of first sheet 111 is a trailer element 121 comprising a rectangular sheet folded longitudinally upon itself to provide two layers secured one to another at 122 and to first sheet 111 at 123. One of the layers of trailer element 121 is provided with a V-shaped notch 124 in its longitudinal edge. Spacer elements 125 and 126 are attached to trailing end section 115 of carrier sheet 114. The purpose and functions of each of the elements and their manner of association, as well as means for employing the film units in appropriate photographic apparatus, is set forth fully in the previously cited U.S. Patent 2,978,971.

Film unit 110 thus comprises a complete, individual photographic product manufactured directly from continuous webs of the various materials comprising the product. The individual webs of flexible sheet materials are brought together in a lighttight enclosure, in order to protect the photosensitive element of the product, and are associated to form a composite web of film units in side-by-side relationship. Severing a portion of this composite web provides a completed film unit.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:
1. A process for the continuous manufacture of photographic products of the type herein described, said process comprising: sequentially and in spaced relationship attaching containers carrying a fluid-processing composition to a continuous, moving first web, introducing said first web with said containers attached to a substantially lighttight enclosure through a first inlet portion thereof, attaching a continuous, moving second web of photosensitive material on a flexible support to said first web along one longitudinal edge of each of said first and second webs, introducing a continuous moving third web of flexible sheet material into said lighttight enclosure through a second inlet portion thereof, attaching said third web along one longitudinal edge thereof to a portion of said first web whereby said third web overlies said containers and at least a portion of said second web, and severing an end portion of the composite web comprising said first, second and third webs from the remainder thereof, said end portion comprising said photographic product.

2. A process for the continuous manufacture of photographic products of the type herein described, said process comprising: introducing a continuous moving first web of flexible sheet material into a substantially lighttight enclosure through an inlet portion thereof, sequentially attaching containers carrying the fluid-processing composition to said first web, attaching a continuous moving second web of photosensitive material on a flexible support to said first web along one longitudinal edge of each of said first and second webs, attaching a continuous moving third web of a flexible sheet material along one longitudinal edge thereof to said first web thereby forming a continuous composite web, and severing an end portion, comprising said photographic product from the remainder of said continuous composite web.

3. The process according to claim 2 whereby all of said webs are intermittently advanced, being alternately moving and stationary.

4. A process for the continuous manufacture of photographic products of the type herein described, said process comprising: attaching containers carrying a fluid-processing composition sequentially and in spaced relationship to a continuous moving first web of flexible sheet material, introducing said first web with said containers attached into a substantially lighttight enclosure through an inlet portion thereof, attaching a continuous moving second web of photosensitive material on a flexible support to said first web along one longitudinal edge of each of said first and second webs, attaching a continuous moving third web of flexible sheet material along one longitudinal edge thereof to a portion of said first web whereby said third web overlies said containers and at least a portion of said second web, removing a portion of said composite web comprising portions of said first and third webs thereby continuously forming a supply of said photographic products in side-by-side relationship, and severing an end portion comprising a single photographic product from the remainder of said supply.

5. A process for the continuous manufacture of photographic products of the type herein described, said process comprising: attaching containers carrying a fluid-processing composition sequentially and in spaced relationship to a continuous, moving first web of flexible sheet material, introducing said first web with said containers attached into a substantially lighttight enclosure through a first inlet portion thereof, attaching a continuous moving second web of photosensitive material on a flexible support to said first web along one longitudinal edge of each of said first and second webs, forming a continuous moving third web of flexible sheet material from two initially independent webs one of which has rectangular areas removed from an interior portion thereof, said rectangular areas overlying the other of said initially independent webs, introducing said third web into said lighttight enclosure through a second inlet portion thereof, attaching said third web along one longitudinal edge thereof to a portion of said first web whereby said third web overlies said containers and at least a portion of said second web, and severing an end portion of the composite web, comprising said first, second and third webs from the remainder thereof, said end portion comprising said photographic product.

6. The process according to claim 5 wherein said composite web is alternately engaged and disengaged by feeding means which advance said composite web, and thereby said first, second and third webs, in an intermittent manner, causing all of said webs to be alternately moving and stationary.

7. The process according to claim 6 wherein said composite web is positively engaged at all times, both when moving and when stationary.

8. A process for the continuous manufacture of photographic products of the type herein described, said process comprising: attaching containers carrying a fluid-processing composition sequentially and in spaced relationship to a continuous, moving first web of flexible sheet material, introducing said first web with said containers attached into a substantially lighttight enclosure through a first inlet portion thereof, overlapping an edge portion of said first web with a continuous, moving second web of photosensitive material on a flexible support, continuously attaching said first and second webs by the application of heat and pressure to the overlapped portions of said first and second webs, arranging a continuous moving third web of a flexible sheet material with an edge portion thereof overlying an inner portion of said first web, continuously attaching said third web to said first web by the application of heat and pressure to said edge portion of said third web thereby forming a composite web of said first, second and third webs, removing a portion of said composite web thereby forming a continuous supply of said photographic products in side-by-side relation, and severing an end portion of said composite web from the remainder thereof, said end portion comprising a single one of said photographic products.

9. The process according to claim 8 wherein said third web is formed from two initially independent webs, one of which has rectangular areas removed from an interior portion thereof, said rectangular areas overlying the other of said initially independent webs, said initially independent webs being attached in at least the portions bounding said rectangular areas.

10. The process according to claim 9 wherein said third web is introduced into said lighttight enclosure through a second inlet portion thereof.

11. Apparatus for the continuous manufacture of photographic products of the type herein described, said apparatus comprising, in combination, means for positioning containers carrying fluid-processing composition with respect to a first continuous, moving web of flexible sheet material, means for attaching said containers to said first web, means for attaching second and third continuous moving webs to said first web, a substantially lighttight enclosure having at least one inlet portion through which said webs may be intoduced into aaid enclosure means for intermittently advancing the composite web formed from said first, second and third webs through said enclosure, means for removing portions of said composite web thereby forming a continuous web of said photographic products in side-by-side relationship, and means for severing said photographic products from the remainder of said continuous web of said photographic products.

12. Apparatus for the continuous manufacture of photographic products of the type herein described, said apparatus comprising, in combination, means for sequentially positioning in spaced relationship on a continuous moving first web containers carrying a fluid-processing composition, means for attaching second and third continuous moving webs, at least one of which comprises a photosensitive material on a flexible support, to said first web thereby forming a composite web of said first, second and third webs, a substantially lighttight enclosure having inlet portions through which at least one of said first, second and third webs are introduced into said enclosure, means for positively engaging said composite web and intermittently advancing it through said apparatus, and means for severing portions comprising said photographic products from said composite web.

13. Apparatus for the continuous manufacture of photographic products of the type herein described, said apparatus comprising, in combination, first means for the engaging of individual containers carrying a fluid-processing composition from a continuous supply of said containers, means for positioning said containers sequentially and in spaced relationship with respect to a first continuous moving web of flexible sheet material, laminating means for attaching said containers to said first web, a substantially lighttight enclosure having an inlet portion comprising a plurality of openings each of which is movable between open and closed positions, at least one of said openings being in said closed position at any given time, laminating means for attaching second and third continuous moving webs to said first web thereby forming a continuous moving composite web, means for positively engaging said composite web and intermittently advancing it through said apparatus, means for removing individual portions from said composite web, said individual portions including at least a portion of one edge of said composite web, and means for sequentially severing end portions from said composite web, said end portions comprising said photographic products.

14. A process for the continuous manufacture of photographic products of the type herein described, including a flexible leader sheet, a second sheet and a photosensitive sheet, said process comprising: supplying the flexible material of said leader sheet, second sheet and photosensitive sheet in the form of first, second and third continuous webs respectively, sequentially attaching containers carrying a fluid processing composition to said first web in spaced relationship along its length, attaching both said second and third webs to said first web along lines parallel to the longitudinal axis of the first web with said second web overlying said containers and at least a photosensitive area of said third web so as to form a continuous composite web of said photographic products in side-by-side relation, at least said third web being maintained, during said process, in a lighttight enclosure, and severing successive end portions, each constituting a single, complete one of said photographic products, from said composite web.

15. The process according to claim 14 wherein said composite web is intermittently advanced, being alternately moving and stationary.

16. The process according to claim 15 wherein said composite web is positively engaged at all times, both when moving and when stationary.

References Cited by the Examiner
UNITED STATES PATENTS

| | | | |
|---|---|---|---|
| 2,435,717 | 2/1948 | Land | 96—29 |
| 2,455,111 | 11/1948 | Carbone et al. | 96—29 |

EARL M. BERGERT, *Primary Examiner.*

W. J. VAN BALEN, *Assistant Examiner.*